US005520575A

United States Patent [19]
Dickson

[11] Patent Number: 5,520,575
[45] Date of Patent: May 28, 1996

[54] METHOD FOR REDUCING CONTAMINATION OF ANIMAL CARCASSES DURING SLAUGHTERING

[75] Inventor: James S. Dickson, Ames, Iowa

[73] Assignee: Iowa State University Research Foundation, Ames, Iowa

[21] Appl. No.: 349,056

[22] Filed: Dec. 2, 1994

[51] Int. Cl.⁶ ........................................ A22B 5/16
[52] U.S. Cl. ................................ 452/125; 452/128
[58] Field of Search ................... 452/125, 128, 452/129, 130; 426/331, 332

[56] References Cited

U.S. PATENT DOCUMENTS

| | | | |
|---|---|---|---|
| 3,657,768 | 4/1972 | Snowden | 17/11.2 |
| 3,934,044 | 1/1976 | Busch et al. | 426/326 |
| 3,958,020 | 5/1976 | de Vries | 426/265 |
| 4,164,056 | 8/1979 | Hilgner | 452/128 |
| 4,279,059 | 7/1981 | Anderson et al. | 17/51 |
| 4,307,490 | 12/1981 | Watkins et al. | 452/125 |
| 4,337,549 | 7/1982 | Anderson et al. | 17/1 R |
| 4,468,839 | 9/1984 | Chittenden | 17/51 |
| 4,852,216 | 8/1989 | Clayton et al. | 17/50 |
| 4,862,557 | 9/1989 | Clayton et al. | 17/1 R |
| 5,069,922 | 12/1991 | Brotsky et al. | 426/332 |
| 5,143,739 | 9/1992 | Bender et al. | 426/332 |
| 5,192,570 | 3/1993 | Bender et al. | 426/332 |
| 5,234,703 | 8/1993 | Guthery | 426/331 |
| 5,354,568 | 10/1994 | Bender et al. | 426/332 |
| 5,389,390 | 2/1995 | Kross | 426/332 |

*Primary Examiner*—Willis Little
*Attorney, Agent, or Firm*—Greenlee, Winner and Sullivan

[57] ABSTRACT

A method for reducing contamination of animal carcasses during slaughtering, particularly bovine carcasses. Contamination of carcasses during slaughtering is reduced by applying water and/or an aqueous antimicrobial solution to the carcass concurrently with hide removal. The stickiness of the exposed carcass surface is reduced, so fewer contaminants adhere to the surface, or adhere less tightly, thus minimizing contamination and improving the efficiency of subsequent cleaning procedures.

19 Claims, No Drawings

METHOD FOR REDUCING CONTAMINATION OF ANIMAL CARCASSES DURING SLAUGHTERING

FIELD OF THE INVENTION

The present invention relates to a method for reducing contamination of animal carcasses, particularly cattle. More specifically, this invention relates to a method of reducing contamination of carcasses during slaughtering by applying water and/or an aqueous antimicrobial solution to the carcass concurrently with hide removal. The stickiness of the exposed carcass surface is reduced, so fewer contaminants adhere to the surface, or adhere less tightly, improving subsequent cleaning efficiency.

BACKGROUND OF THE INVENTION

Between 22 and 24 million cattle are slaughtered annually in the United States. Of these, over half are processed by high-output meat packing plants using state-of-the-art technology. Despite modern processing procedures, bacterial contamination of fresh meat occurs as an undesirable but unavoidable result of converting live animals into food. Although current Good Manufacturing Procedures (GMPs) can reduce this contamination, the total elimination of bacteria from fresh raw meats has not been achieved. Since deep muscle tissue is considered sterile in healthy animals, essentially all of the contamination originates from the carcass surfaces. Soil, dust and manure on the hides and hooves of the animals represent the primary source of contamination. In addition, in rare cases internal organs rupture during the removal process, resulting in further contamination of the carcass.

Conventional slaughtering operations are designed for high volume processing. The animals are herded from holding pens through inclined walkways into the plant. Once in the plant, the animal enters a restricted area with a pivoting floor. The animal is then stunned, typically with a captive bolt stunner, and the floor of the restricted area pivots, sliding the animal onto the processing floor. One of the rear legs of the animal is shackled, and the shackle is hooked to the processing rail. The animal travels (head down) along the rail to the bleeding, or "sticking" area, where the carotid arteries and jugular vein are severed. Since the heart is still beating, the blood in the animal drains out very quickly, and the animal is technically dead within one minute. The entire time interval from stunning to death is typically less than five minutes.

The carcass advances from the bleeding area into the processing area. During the initial stages of processing, the hide is peeled from the shackled leg and the front feet are removed. As the carcass continues along the rail, a circular incision is made around the anus, which subsequently drops into the body cavity. Part of the hide is trimmed back from the free hind leg and from the rump area, including the tail, and an incision is made from the hindquarters of the carcass down the belly to the head. The incision is expanded along the underside of the front legs, and the hide is partially trimmed back from the front legs. The hind feet, head and external sexual organs are also removed during the initial stages of the process. The carcass continues down the rail to a mechanical hide puller which removes the hide in a single downward motion.

Some meat processing operations also incorporate pre-evisceration washing and/or sanitizing steps prior to evisceration, preferably within an hour after hide removal. (See Clayton et al., U.S. Pat. Nos. 4,852,216 and 4,862,557). Pre-evisceration washers resemble a drive-through car wash; the skinned carcass is rinsed with low pressure (50 psi or less) water using vertically oscillating spray nozzles. The carcass is also optionally treated with a food-grade sanitizer, typically lactic or acetic acid. Pre-evisceration washing removes contaminants from the carcass surface, while sanitizing inhibits or kills any residual bacteria. Despite the reported reduction in bacterial contamination following pre-evisceration washing, many meat processors omit this step because of space limitations, the expense of implementing the washing system and/or the proprietary nature of this technology.

After the optional pre-evisceration washing and sanitizing steps, the carcass is eviscerated, trimmed to remove any visible contamination ("zero-tolerance" trimming) and washed with water under high pressure, typically 400–450 psi. Unlike pre-evisceration washing, final washing is required by the U.S. Department of Agriculture. The washed carcass is typically sanitized with an organic acid (lactic or acetic) rinse. Finally, the processed carcass is chilled, typically using a combination of forced air chilling and spray chilling.

While various cleansing and sanitizing treatments are known to the art, none reduces the microbial contamination of animal carcasses to acceptable levels. All existing treatments attempt to remove contaminants already present on the surface of the carcass. However, many contaminants, particularly metabolically active bacteria, adhere to the surface of the carcass and become recalcitrant to subsequent washing procedures.

A need therefore exists for an efficient and practical method for reducing or eliminating contamination of animal carcasses during slaughtering. More particularly, a need exists for a means for modifying the surface properties of the exposed animal carcass so that fewer contaminants adhere to the surface, or adhere less tightly, thus minimizing contamination and improving the efficiency of subsequent cleansing procedures.

SUMMARY OF THE INVENTION

The present invention provides a method for reducing contamination of animal carcasses during slaughtering, particularly bacterial contamination of bovine carcasses. However, the present methods are applicable to swine and ovine carcasses as well. According to the invention, the carcass is wetted with water and/or an aqueous antimicrobial solution concurrently with hide removal. The stickiness of the exposed carcass surface is reduced, so fewer contaminants adhere to the surface, or adhere less tightly, improving the efficiency of subsequent washing procedures. Fresh meat products produced according to the invention, by virtue of the lower contamination level, offer reduced risk of food poisoning and improved shelf life over meat products produced by existing methods.

According to the invention, as the hide is removed from animal carcasses during processing, water and/or an aqueous antimicrobial solution is applied to the exposed carcass surface. The application is performed concurrently with hide removal such that the surfaces of the carcass are wet immediately upon exposure. The wetting solution can be applied by hand and/or using a mechanical spraying means. In high-volume processing operations, the wetting solution is preferably applied using a mechanical spraying system installed adjacent to the overhead rail coincident with the hide pulling machinery.

The application of an aqueous solution to the surface of the carcass causes uncoiling of the surface proteins and a temporary reduction in the surface tension. Wetting the exposed carcass surface also partially removes the serum proteins and other biological components which contribute to the "stickiness" of the surface. The surface of the wet carcass is appreciably less "sticky" than the exposed surface of a non-treated carcass. Because of this reduced "stickiness," any subsequent contamination is easier to remove during pre-evisceration washing and/or final washing.

The changes in the surface properties of the processed animal carcasses make contaminants less likely to adhere and also easier to remove. The result is an improvement in the quality of the animal carcass and a reduced risk of the presence of harmful bacteria. The method of the present invention also reduces the levels of spoilage microflora on the carcass surface, thus minimizing the extent of "zero-tolerance" trimming and improving the shelf life of the fresh meat product.

DETAILED DESCRIPTION OF THE PREFERRED EMBODIMENTS

The present invention relates to a method for reducing contamination of animal carcasses during slaughtering comprising applying a wetting solution to the carcass concurrently with hide removal. The wetting solution reduces the stickiness of the exposed carcass surface so fewer contaminants adhere to the surface, or adhere less tightly, improving subsequent cleaning efficiency.

The method of this invention is generally applicable to animal carcasses including, without limitation, beef, lamb, pork and calves. In the preferred embodiment of this invention, the carcass is a bovine carcass.

"Contamination" or "gross contamination" as used herein generally refers to the presence of foreign matter on the carcass surface. "Microbial contamination" or "bacterial contamination" refers to the presence of undesirable microorganisms or bacteria, respectively. Undesirable microorganisms include putrefactive and pathogenic fungi and bacteria, particularly members of the family Enterobacteriaceae (the enteric group). The enteric group includes notorious pathogens such as Salmonella, Edwardsiella and Shigella. Some of the historically harmless enterobacteria (*Escherichia coli*, Klebsiella, Enterobacter, and Serratia) are now increasingly associated with severe enteric infection.

Contamination of carcasses during slaughtering is "reduced" when a reduction of at least about 5 percent, preferably about 10 percent, and more preferably about 20 percent, in bacterial contamination is shown using the protocols set forth in the examples hereof. Applicant has shown that wetting the carcass during hide removal reduces the levels of Enterobacteriaceae and total aerobic bacteria by approximately 25% and 90%, respectively.

The application of an aqueous solution to the surface of the carcass causes a temporary reduction in the surface tension, making the surface of the carcass appreciably less "sticky." Without wishing to be bound by any particular theory, applicant believes that the reduction in surface tension results from a residual film of water on the surface following treatment. This film of water likely hydrates the surface proteins typically present on the surface of animal tissues. Because of their "stickiness," surface proteins have historically been used in the manufacture of adhesives. As the surface proteins are hydrated by the wetting solution they begin to uncoil, destroying the characteristic shape of the protein and with it the characteristic adhesive property. Alternatively, or in addition, the film of water suspends the contaminants above the carcass surface, preventing attachment thereto. It is also possible that the water layer modifies the hydrophobicity of the carcass surface, interfering with the binding of contaminants. Finally, the wetting solution likely removes some of the serum proteins, which further contribute to the "stickiness" of the carcass surface. Regardless of the actual mechanism or mechanisms, the examples herein illustrate that the application of a wetting solution during hide removal affects a significant reduction in contamination.

As used herein, "wetting solution" means water or an aqueous antimicrobial solution. In one embodiment of this invention, the "aqueous antimicrobial solution" is an aqueous solution comprising an antimicrobial agent. Antimicrobial agents are known to those skilled in the art and are readily available in commerce. Known antimicrobial agents include, without limitation, various detergents, salts, enzymes, antibiotics, inorganic salts, salts of organic acids, chlorine, fluoride, and alkaline sanitizers such as sodium hydroxide and potassium hydroxide, or any combination thereof. The choice of a particular antimicrobial agent is not critical to the invention. However, as will be appreciated by those skilled in the art, to be useful in this invention the antimicrobial agent must be approved by the U.S. Department of Agriculture. The preferred, USDA-approved antimicrobial agent is trisodium phosphate.

The concentration of the antimicrobial agent generally depends upon the particular agent or combination of agents and the degree of contamination of the carcass. The antimicrobial agent concentration typically ranges from about 1 to about 30 percent, preferably from about 5 to about 20 percent, and most preferably from about 10 to about 12 percent by weight.

In an alternate embodiment, the aqueous antimicrobial solution comprises water and an organic acid or combination of acids. Suitable organic acids are known to those skilled in the art and are readily available in commerce. Preferred organic acids are approved by the U.S. Department of Agriculture, including acetic and lactic acids. When the wetting solution is an aqueous organic acid solution, the organic acid is present at a concentration of about 0.05 to about 5.0 percent, more preferably between about 0.5 and about 2.0 percent.

The present invention is independent of the temperature of the animal carcass. However, because skinning is easier while the carcass is still warm, hide removal typically occurs within about 10 to 15 minutes after death.

The temperature of the wetting solution is also not critical, but typically ranges from about 32° F. to about 210° F., and preferably from about 45° F. to about 120° F.

As discussed elsewhere herein, the timing of the wetting application is critical; the wetting solution must be applied concurrently with hide removal such that the surfaces of the carcass are wet immediately upon exposure. It is also critical that the exposed surfaces remain moist throughout the hide removal procedure and until the final washing step. If the wetting solution evaporates, the surface proteins resume their normal coiled configuration and the surface tension (and hence "stickiness") increases accordingly.

It should be emphasized that the present invention does not involve washing of the carcass. Although the surface of the exposed carcass must remain wet throughout the hide removal procedure, the volume of wetting solution used in the present invention is significantly less than the amount of liquid required for washing. The volume of wetting solution generally depends upon the size of the carcass, the ambient air temperature, and the duration of the hide removal procedure. The volume of wetting solution typically ranges from about 0.25 to about 2 ml/cm$^2$ of surface area.

Unlike existing cleaning and sanitizing procedures, the method of the present invention does not remove contaminants from the surface of the carcass. Rather, the present method effectively modifies the surface properties of the exposed animal carcass so fewer contaminants adhere to the surface, or adhere less tightly, thus improving the efficiency of subsequent cleansing procedures. Any existing or subsequent microbial contamination is killed or inhibited by the antimicrobial agent or organic acid in the wetting solution. However, the use of an antimicrobial agent or organic acid is optional.

According to the present invention, the wetting solution is applied concurrently with hide removal, preferably using a mechanical spraying system in conjunction with a mechanical hide puller. However, the present invention also contemplates the use of additional applications of wetting solution during the initial stages of processing, prior to hide removal. For example, wetting solution may be applied to the carcass while the hide is detached from the legs and/or rump area.

The method of the present invention complements existing washing and sanitizing procedures. The instant method, rather than replacing pre-evisceration or final washing, improves the efficiency of these subsequent washing procedures. Applicant has discovered that wetting the carcass during hide removal significantly improves or eliminates contamination of animal carcasses.

EXAMPLES

Example 1

Sample preparation

Beef tissue samples (4 cm×13 cm) with the hide still attached were removed from the neck area of market-weight steers within 10 minutes of exsanguination. The tissue samples were divided into two groups (control and treatment) and transported to the laboratory within 5 minutes of sampling. The hide from the control tissue was removed in a manner simulating a commercial hide puller. The muscle tissue was attached to a vise on the laboratory bench, and the hide was pulled off with a pair of pliers. The treated tissue was processed in a similar manner, except that water was applied to the surface during hide removal using a spray mister bottle. The hide removal and spraying procedures were performed simultaneously to ensure that water contacted the subcutaneous tissue immediately upon exposure.

Example 2

Surface tension

Tissue samples were prepared as described in Example 1. To determine the effect of wetting on surface tension, the surface free energy of the two samples were analyzed using the sessile drop technique, as described in Dickson, J. S., and Koohmaraie, M. (1989) "Cell surface charge characteristics and relationship to bacterial attachment to meat surfaces," Appl. Environ. Microbiol. 55:832–836, incorporated by reference herein. Surface tension was calculated using the contact angle of a 25 μl sessile drop of distilled water. Analysis began immediately after hide removal and continued at 5 minute intervals for a total time of 20 minutes post-treatment.

As shown in Table 1, wetting the exposed surface reduces or eliminates the surface tension of the beef tissue. The treated sample has no measurable surface tension. In fact, treated subcutaneous surfaces have no surface tension as long as they remain wet. Values for the control sample represent typical surface tensions for beef tissue after hide removal. Wetting the exposed carcass surface significantly reduces surface tension, which minimizes susceptibility to contamination and facilitates subsequent washing procedures.

TABLE 1

| | Surface tension (ergs/cm$^2$) | | | | |
|---|---|---|---|---|---|
| | Time (minutes) | | | | |
| | 0 | 5 | 10 | 15 | 20 |
| Control | 3.4 | 4.2 | 4.2 | 4.2 | 4.7 |
| Treated | 0.0 | 0.0 | 0.0 | 0.0 | 0.0 |

Example 3

Microbiological analysis

Tissue samples were prepared as described in Example 1. To determine the effect of wetting on subsequent bacterial contamination, both tissue samples were inoculated with a uniform fecal smear using manure collected from the animals during antemortem inspection. Ten minutes after inoculation, the tissues were washed with running distilled water for 10 seconds to remove the fecal matter. Samples (2 cm×2 cm) were removed and plated on trypticase soy agar and violet red bile glucose agar for analysis of total aerobic bacteria (TAB) and Enterobacteriaceae (ENT), respectively. Spread plates were prepared, inoculated and incubated as described in Peeler, J. P., and Matuoliam, L. J. (AOAC Intl. 7th ed. 1992) "Food and Drug Administration Bacteriological Analytical Manual," pp. 17–26, incorporated herein by reference. The total aerobic bacteria plate count indicates the overall level of bacterial contamination.

TABLE 2

| | Plate count | |
|---|---|---|
| | Total Aerobic Bacteria | Enterobacteriaceae |
| Control | 4.26[1] | 2.70 |
| Treated | 3.38[1] | 2.18 |

[1]$Log_{10}$ colony forming units/ cm$^2$.

As shown in Table 2, bacterial contamination of the treated tissue was significantly ($P<0.05$) lower than the control tissue. Because Table 2 reports the total aerobic bacteria in $log_{10}$ values, treatment effectively reduced the total aerobic bacterial count by approximately 90 percent (0.88 $log_{10}$ units). Although less dramatic, enterobacterial contamination of the treated tissue was also significantly lower (approximately 23 percent) than the control tissue.

Example 4

Electron microscopic analysis

Beef tissue samples were prepared and inoculated as described in Example 3. After washing with distilled water, samples were removed and transferred to 4% glutaraldehyde/3% paraformaldehyde in 0.05M cacodylate buffer for electron microscopic analysis, as described in Dawes, C. J. (1971) "Biological Techniques in Electron Microscopy," incorporated herein by reference. The control tissue (magnification 50×) showed gross contamination (straw) after washing with distilled water. In contrast, the treated tissue (magnification 160×) showed no visible contamination after washing.

As will be appreciated by those skilled in the art, the foregoing examples are illustrative only and not meant to limit the scope of this invention which is defined by the appended claims and by equivalents to the claimed embodiments which would be obvious to one skilled in the art in view of the teachings herein.

I claim:

1. A method for reducing contamination of animal carcasses during slaughtering comprising applying a wetting solution to the carcass surface concurrently with hide removal wherein the surface of the carcass is wet immediately upon exposure of an initial portion of the carcass surface, and continually applying said solution to said surface throughout the hide removal procedure to keep said surface moist.

2. The method of claim 1 wherein said animal carcass is selected from the group consisting of bovine, swine and ovine carcasses.

3. The method of claim 1 wherein said animal carcass is a bovine carcass.

4. The method of claim 1 wherein said wetting solution comprises water.

5. The method of claim 4 wherein said wetting solution further comprises an antimicrobial agent.

6. The method of claim 5 wherein said antimicrobial agent is trisodium phosphate.

7. The method of claim 5 wherein said antimicrobial agent is present in an amount of from about 10 to about 12 percent by weight.

8. The method of claim 4 wherein said wetting solution further comprises an organic acid.

9. The method of claim 8 wherein said organic acid is acetic acid or lactic acid.

10. The method of claim 8 wherein said organic acid is present in an amount of from about 0.5 to about 2.0 percent by weight.

11. The method of claim 1 wherein the temperature of said wetting solution is between about 45° F. and about 120° F.

12. The method of claim 1 wherein said wetting solution is applied in an amount of from about 1 ml to about 2 ml per square centimeter of surface area.

13. The method of claim 1 wherein said wetting solution is applied using a mechanical spraying means.

14. The method of claim 13 wherein said mechanical spraying means is installed adjacent to an overhead rail coincident with a mechanical hide puller.

15. The method of claim 1 further comprising applying said wetting solution to said animal carcass prior to hide removal.

16. A method for reducing bacterial contamination of beef carcasses during slaughtering comprising applying a wetting solution to the beef carcass surface concurrently with hide removal wherein the surface of the carcass is wet immediately upon exposure of an initial portion of the carcass surface, and continually applying said solution to said surface throughout the hide removal procedure to keep said surface moist.

17. The method of claim 16 wherein said bacterial contamination is bacteria of the family Enterobacteriaceae.

18. The method of claim 16 wherein said bacterial contamination is reduced by about 20 percent as compared to an untreated beef carcass.

19. The method of claim 18 wherein said bacterial contamination is based on colonies of total aerobic bacteria.

* * * * *